Nov. 18, 1947.     E. W. TAYLOR     2,430,966
JOINER LINK FOR CHAIN SLINGS
Filed April 26, 1945
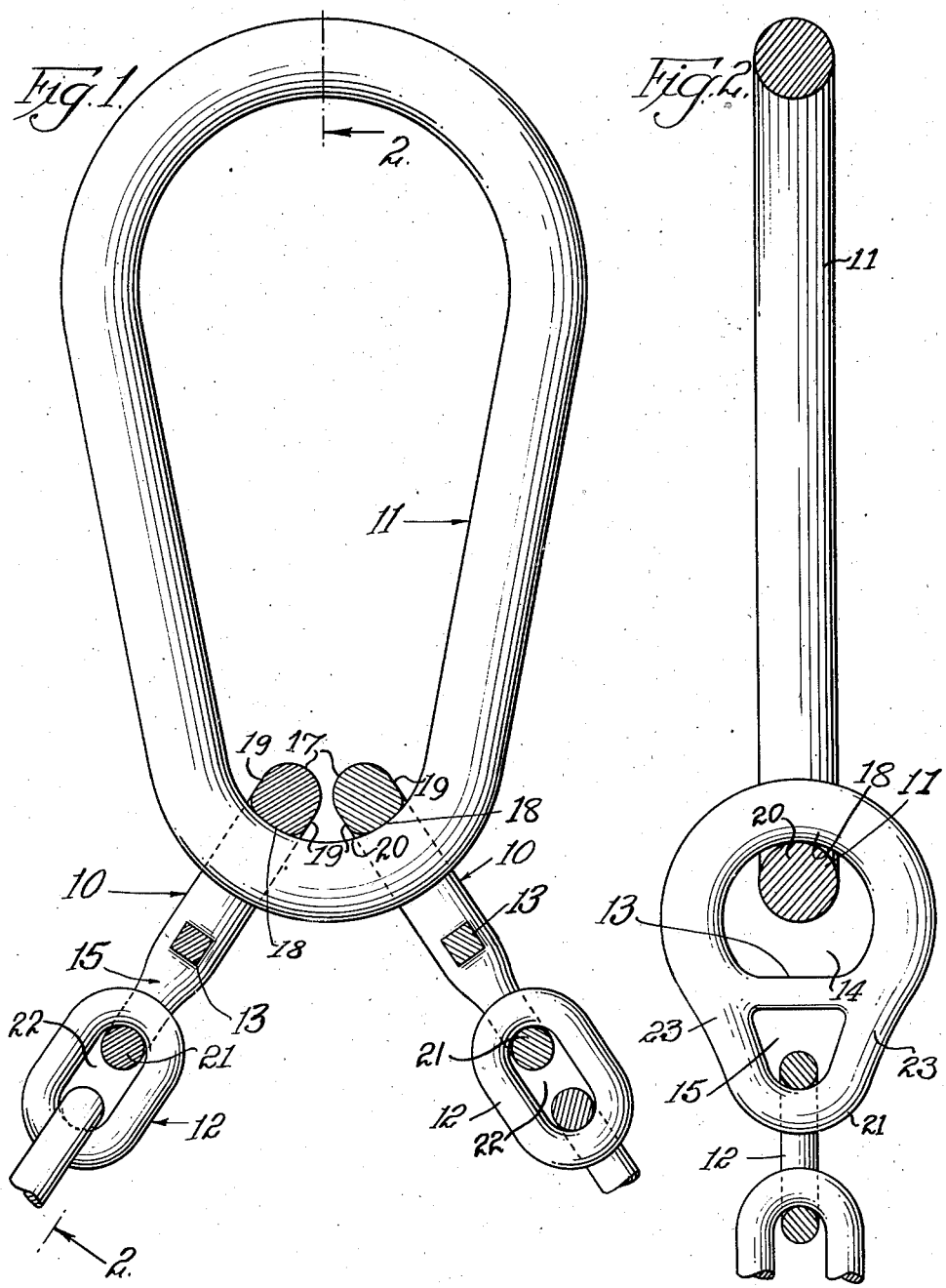
INVENTOR.
Edward W. Taylor
BY
Harvey M. Gillespie
Atty.

Patented Nov. 18, 1947

2,430,966

UNITED STATES PATENT OFFICE 2,430,966

JOINER LINK FOR CHAIN SLINGS

Edward W. Taylor, Hammond, Ind., assignor to S. G. Taylor Chain Company, Hammond, Ind., a corporation of Illinois Application April 26, 1945, Serial No. 590,360

3 Claims. (Cl. 59—84)

This invention relates to an improved joiner link for connecting a chain section to a large link, ring or hook element of the chain.

A principal object of the invention is to provide a joiner link of the above character which will have free pivotal movement on a coengaging bearing surface of the large link, ring or hook equivalent to the free pivotal movement obtained by the usual point contact between adjacent links of a chain, but which will avoid the excessive wear incident to such point contact. In this connection the invention contemplates the provision of a joiner link in which its bearing surface for engaging an adjacent element is so formed as to have a line contact with said adjacent element as distinguished from the usual point contact and from a surface contact of substantial area.

Another object of the invention is to provide a joiner link of pear-shape configuration in which the end portion having the larger radius for interlinking with the large link or hook is formed of relatively heavy stock and the end portion having the smaller radius is formed of thinner stock. The thinner stock permits the smaller end of the joiner link to fit loosely in the opening of a smaller link of a chain.

A further object of the invention is to provide a joiner link of the above character with a cross-stud which extends across the link to provide reinforcement thereof at the juncture of the heavy stock with the lighter stock, which cross-stud will prevent the smaller end portion of the joiner link from moving into engagement with the large link or hook; the said stud being preferably spaced inwardly from the side planes of the link so that name plates or other identifying markers applied to the stud will not be brought into rubbing contact with other parts of the chain or other objects.

The invention is illustrated in a preferred embodiment in the accompanying drawing wherein:

Fig. 1 is a side view of a portion of a chain sling showing a pair of joiner links constructed in accordance with this invention for connecting smaller links of a pair of chains to a large link or other attaching device.

Fig. 2 is a side view of a joiner link and a portion of a sling chain connected therewith.

Referring to the drawing: the improved joiner link designated generally by the reference numeral 10 is illustrated herein in connection with a chain sling. The chain sling includes a large main link 11, a pair of joiner links 10, and a pair of chain sections composed of smaller links 12. The large link 11 may be of any desired configuration suitable for attaching the chain sling or a portion thereof to a hoist or other element. If desired, a ring may be substituted for the large link herein shown. In fact, the sling chain may be provided with a link at one end and a hook at the other end in accordance with the accepted practice. Each joiner link 10 is preferably of pear-shaped configuration and is provided with a cross-bar or stud 13 which so divides the link as to provide it with a relatively large upper opening 14 for receiving the relatively heavy lower portion of the large link 11 and a smaller opening 15 for receiving one of the small links 12 of the sling chain. In order to provide the joiner link 10 with sufficient strength to withstand the bending and other strains to which it is normally subjected when in service, the upper portion 12 thereof is formed of relatively heavy stock. Preferably the outer surface of the said upper portion of the link is curved transversely to form a semi-circle in cross-section as shown best at 17 in Fig. 1. This transverse curving of the links permits them to be arranged in pairs and in close relation to each other, as shown in Fig. 1 of the drawing, without bringing the links into objectionable rubbing engagement with each other. The use of the transversely rounded stock at the upper end of the link is made practicable by reason of the fact that the link is strengthened by so forming the inner face 18 and adjacent side faces 19—19 as to provide additional metal at these locations. Preferably the inner surface 18 is defined by a large radius which meets the said side faces to form an obtuse angle. The said large radius corresponds to the radius of the co-engaging bearing surface 20 of the large link 11. Consequently, the bearing surface 18 of the joiner link will have a line contact with the curved inner surface 20 of the large link 11. The said line contact, as distinguished from a wide surface bearing, permits freer pivotal movement of the joiner link than is obtained in links having wide co-engaging surfaces, but at the same time minimizes the wear on the links.

The lower end 21 of the link is made of smaller stock than the upper end so that the lower portion of the link will move freely within the opening 22 of the smaller link 12. The curved lower end portion of the link merges into substantially straight side bars 23—23 which join the heavier stock of the upper portion of the link at locations adjacent opposite ends of the cross-stud 13. The location of the cross-stud 13 not only reinforces the link but also prevents the small end portion of the link from moving into engagement with the large link 11. Preferably, the cross-stud 13 is rectangular in cross-section and is spaced inwardly from the side planes of the link so that name plates or other identifying markers can be applied to the stud and will not be brought into rubbing contact with other parts of the chain or other objects.

I claim:

1. A chain link for connecting a chain section to an end attaching device, comprising a body of substantially pear-shape to provide an end portion made relatively thick and curved on a large radius to form a suitable opening to receive said end attaching device, an end portion of stock of less thickness transversely of the link than the transverse thickness of the stock at the other end of the link and curved on a smaller radius to provide an opening for receiving an end link of a chain section, substantially straight side bars connecting said curved end portions, and a rigidifying stud extending across the link at the junction of the side bars with the larger curved end, whereby the said pear-shaped link cannot shift its position to engage the smaller curved portion of the link with the said attaching device, and the said rigidifying stud being spaced inwardly from the opposite side planes of the link so as to prevent rubbing engagement thereof with adjacent elements.

2. A chain link for connecting a chain section to an end attaching device, comprising a body of substantially pear-shape to provide an end portion made relatively thick and curved on a large radius to form a suitable opening to receive said end attaching device, an end portion formed of stock of smaller cross-sectional area and curved on a smaller radius to provide an opening for receiving an end link of a chain section, substantially straight side bars connecting said curved end portions and corresponding in thickness to the smaller curved end of the link, and a rigidifying stud extending across the link at the junction of the side bars with the larger curved end, whereby the said pear-shaped link cannot shift its position to engage the smaller curved portion of the link with the said attaching device, and the said rigidifying stud being spaced inwardly from the opposite side planes of the link so as to prevent rubbing engagement thereof with adjacent elements.

3. A chain link for connecting a chain section to an end attaching device, comprising a body of substantially pear-shape to provide an end portion made relatively thick and curved on a large radius to provide a suitable opening to receive a curved end of said attaching device, an end portion formed of stock of smaller cross-sectional area and curved on a smaller radius to provide an opening for receiving an end link of a chain section, substantially straight side bars connecting said curved end portions and corresponding in thickness to the smaller curved end of the link, and a rigidifying stud extending across the link at the junction of the side bars with the larger curved end, whereby the said pear-shaped link cannot shift its position to engage the smaller curved portion of the link with the said attaching device, and the inner surface of the larger end of the link being curved transversely with a radius corresponding to the radius of the curved end of said attaching device so as to provide a line contact therewith.

EDWARD W. TAYLOR.

REFERENCES CITED

The following references are of record in the file of this patent:

UNITED STATES PATENTS

| Number | Name | Date |
| --- | --- | --- |
| 1,313,949 | Mountford | Aug. 26, 1919 |
| 2,103,972 | Harris | Dec. 28, 1937 |